(12) United States Patent
Verbo et al.

(10) Patent No.: US 6,928,918 B2
(45) Date of Patent: Aug. 16, 2005

(54) PNEUMATIC BRAKE BOOSTER COMPRISING IMPROVED SEALING MEANS

(75) Inventors: Ulysse Verbo, Sant Cugat (ES); Jean-Pierre Michon, Saint Pathus (FR)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 10/394,468

(22) Filed: Mar. 21, 2003

(65) Prior Publication Data

US 2003/0177898 A1 Sep. 25, 2003

(30) Foreign Application Priority Data

Mar. 21, 2002 (FR) .......................................... 02 03583

(51) Int. Cl.⁷ .............................................. B60T 13/56
(52) U.S. Cl. .................... 91/376 R; 92/98 D
(58) Field of Search ................. 91/376 R; 92/98 R, 92/98 D, 99, 96

(56) References Cited

U.S. PATENT DOCUMENTS 3,037,487 A * 6/1962 Brooks ..................... 91/376 R
4,270,353 A * 6/1981 Thomas et al. ............. 92/98 D
4,423,665 A * 1/1984 Haar .......................... 92/98 D
4,495,854 A * 1/1985 Hibino ......................... 92/99

* cited by examiner

Primary Examiner—Thomas E. Lazo
(74) Attorney, Agent, or Firm—Leo H McCormick, Jr.; Warren Comstock

(57) ABSTRACT

A pneumatic brake booster comprising an envelope of longitudinal axis formed of a dish having a rim and a lid. The envelope defines an interior volume that is divided into a variable-pressure work chamber and a low-pressure chamber by a skirt. The skirt is mounted to sealingly slide along the longitudinal axis of the envelope. The skirt has a central orifice with a pneumatic piston sealingly mounted therein. The sealing between the variable-pressure work chamber and the low-pressure chamber is achieved by a first sealing member arranged between a radially internal first end of the skid and a radially external end of the piston and a second sealing member arranged at a radially external second end of the skid and an internal surface of the rim. The skid provides sealing between the radially external first end of the skirt and the radially internal second end of the skirt.

9 Claims, 3 Drawing Sheets

PNEUMATIC BRAKE BOOSTER COMPRISING IMPROVED SEALING MEANS

The present invention relates mainly to a pneumatic brake booster comprising improved means of sealing between a variable-pressure first pneumatic chamber and a second pneumatic chamber subjected to a low pressure.

A pneumatic brake booster of the known type comprises an envelope defining an interior volume divided by a skirt into a first working chamber and a second vacuum chamber. The vacuum chamber is subjected to a low-pressure fluid, and the work chamber is a variable-pressure chamber the pressure being able to vary between a low pressure and a high pressure, for example air at atmospheric pressure. The skirt of roughly annular shape receives, in its central part, a pneumatic piston extending toward the rear of the booster and comprising a three-way valve. This three-way valve is actuated by an actuating rod connected to a brake pedal. Opposite the end of the three-way valve receiving the actuating rod is arranged a push rod which will actuate at least one piston of the master cylinder. Sealing between the work chamber and the vacuum chamber is achieved between the skirt and the pneumatic piston and between the skirt and the envelope by a single diaphragm, for example made of rubber of roughly annular shape and fixed for example by trapping to the exterior periphery of the pneumatic piston and also by trapping to the interior periphery of the envelope between a first and a second shell that form the envelope of the booster.

However, this type of sealing afforded by a diaphragm of roughly annular shape poses problems in terms of cost. Indeed, there is a significant materials cost because the diaphragm represents a significant piece to be made with rubber, and there is also a significant cost involved in manufacturing this diaphragm because it is of a relatively complicated shape, and finally, there is a high cost of mounting in the booster because this mounting entails special tools and a certain amount of care in order not to damage this diaphragm. In addition, motor manufacturers are increasingly wanting to have lighter-weight products so as to lighten the vehicle, and this diaphragm because of its size makes a not insignificant contribution to the weight of the booster as a whole.

It is therefore an object of the present invention to offer an inexpensive means of sealing between the work chamber and the vacuum chamber.

Another object of the present invention is to offer a means of sealing between the work chamber and the vacuum chamber that is simple and economical to mount.

Another object of the present invention is to offer a means of sealing between the work chamber and the vacuum chamber that is simple to manufacture.

Another object of the present invention is to offer a means of sealing between the work chamber and the vacuum chamber that is of low weight.

These objects are achieved by a pneumatic brake booster comprising an envelope split into a work chamber and a vacuum chamber by a skirt equipped in its central part with a pneumatic piston, sealing between the work chamber and the vacuum chamber at the contact between the skirt and the pneumatic piston and the skirt and the internal periphery of the envelope being afforded by two separate sealing means.

In other words, sealing between the piston and the skirt is performed by means, for example, of an O-ring seal, and sealing between the skirt and the internal periphery of the envelope is performed by a sealing means sliding with sealing over the internal surface of the envelope, and so the skirt in itself provides most of the sealing between the work chamber and the vacuum chamber.

The main subject of the invention is a pneumatic brake booster comprising an envelope of longitudinal axis formed of a dish equipped with a rim and a lid, said envelope defining an interior volume divided sealingly into a variable-pressure work chamber and a low-pressure chamber by a skirt mounted to slide with sealing along the longitudinal axis in the envelope, said skirt being equipped with a central orifice in which a pneumatic piston is sealingly mounted a three-way valve mounted in the pneumatic piston and actuated by an actuating rod connected to a brake pedal, characterized in that sealing between the variable-pressure work chamber and the low-pressure chamber is achieved by a first sealing means arranged between a radially internal first end of the skirt and a radially external end of the piston and by a second sealing means arranged at a radially external second end of the skirt and the internal surface of the rim, the skirt providing sealing between the radially external first end of the skirt and the radially internal second end of the skirt.

Another subject of the invention is a pneumatic brake booster, characterized in that the first sealing means is an O-ring seal mounted in a groove made on the external periphery of the pneumatic piston.

Another subject of the invention is a pneumatic brake booster, characterized in that the second sealing means is a sealing piece of tubular shape fixed to the skirt and bearing against the interior face of the rim of the dish and able to slide over said interior face.

Another subject of the invention is a pneumatic brake booster, characterized in that the sealing piece at a first longitudinal end is fixed by trapping in a fold made on an external radial end of the skirt.

Another subject of the invention is a pneumatic brake booster, characterized in that a low-pressure cavity is produced in the fold, between the interior end of the fold and the first end of the sealing piece.

Another subject of the invention is a pneumatic brake booster, characterized in that the first end of the sealing piece has tabs oriented toward the actuating rod bearing, during braking, upon the skirt.

Another subject of the invention is a pneumatic brake booster, characterized in that a second longitudinal end of the sealing piece, forming a rearwardly-directed lip, is able to slide over the internal face of the rim of the dish.

Another subject of the invention is a pneumatic brake booster, characterized in that the sealing piece is made of rubber.

Another subject of the invention is a pneumatic brake booster characterized in that the sealing piece is made of slippery EPDM.

Another subject of the invention is a pneumatic brake booster, characterized in that the lid is fitted sealingly into the dish.

Another subject of the invention is a pneumatic brake booster, characterized in that the sealing element is an O-ring seal mounted in a groove formed in the external radial end of the lid and bearing against the internal face of the rim of the dish.

Another subject of the invention is a pneumatic brake booster, characterized in that the groove is produced by folding.

The advantage of the present invention is that it allows simple adaptation to suit different types of booster with different envelope diameters simply by changing the size of the means of sealing between the skirt and the internal surface of the envelope without having to modify the shape of this sealing means.

The present invention will be better understood with the aid of the description which follows and of the appended drawings for which front and rear are, respectively, the left-hand part and the right-hand part of the drawings, and in which.

Figure 1:
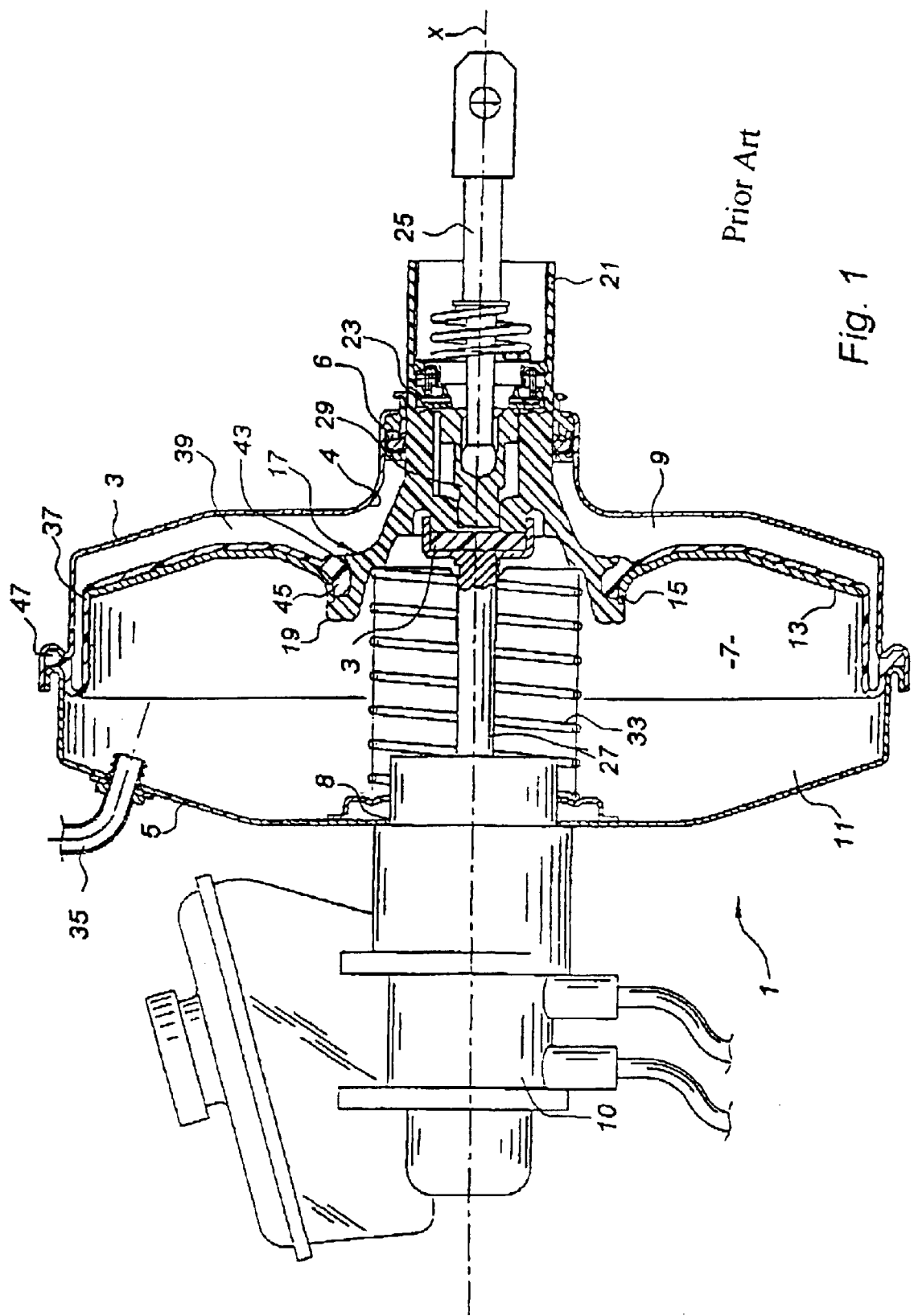
FIG. 1 is a view in longitudinal section of a booster of known type.

In FIG. 1, the elements described hereinbelow are more or less symmetrical of revolution about the axis X, the longitudinal axis of the brake booster described.

FIG. 1 shows a pneumatic brake booster of known type of longitudinal axis X comprising an envelope 1 formed of a first and a second shell 3 and 5, the shells 3 and 5 being crimped together around their exterior periphery. The shell 3 comprises a central orifice 4 extending rearwards in the form of a hollow shaft 6 in which a pneumatic piston 17 is sealingly slideably mounted, the shell 5 comprises a central orifice 8 receiving a master cylinder 10. The envelope 1 defines an interior volume 7 divided sealingly into a work chamber 9 and a vacuum chamber 11 by means of a skirt of roughly annular shape 13 able to move along the axis X under a pressure difference. The skirt 13 in its central part comprises an orifice 15 in which there is sealingly mounted the pneumatic piston 17 comprising, at a first end directed forward, a part of roughly conical shape 19 with the vertex directed toward the rear and, at a second end directed toward the rear a sleeve 21. A three-way valve of known type 23 arranged inside the pneumatic piston is operated by an actuating rod 25 connected to a brake pedal (not depicted). At rest, the three-way valve 23 places the vacuum chamber 11 and the work chamber 9 in communication, and during a braking phase it places the work chamber 9 and the high-pressure external environment in communication.

The braking action afforded by the driver and the boosting afforded by the booster is transmitted to at least one piston of the master cylinder via a push rod 27. A reaction disk 31 is arranged between a distributor plunger 29 forming part of the three-way valve 23 and receiving a longitudinal front end of the control rod 25 and a longitudinal rear end of the push rod 27 and transmitting the reaction from the braking circuit to the brake pedal. A return spring 33 is mounted in compression in the vacuum chamber between the pneumatic piston and the envelope allowing the pneumatic piston and the skirt to return to the rest position.

The vacuum chamber 11 is supplied with low-pressure pneumatic fluid via a sealed connector 35, the low-pressure pneumatic fluid coming, for example, from the engine manifold depression or from a pneumatic pump (not depicted).

Sealing between the front vacuum chamber 11 and the rear work chamber 9 is afforded by means of a diaphragm 39 in the form of a tube 37 of a short length relative to its inside diameter and closed off at one end by an end wall 41, the diaphragm 39 providing sealing between the skirt 13 and the envelope 1 and between the skirt 13 and the pneumatic piston 17.

The end wall 41 of the diaphragm 39, directed toward the rear, comprises a central orifice 43 receiving the front part 19 of the piston 17 to which part the end wall 41 is fixed in a sealed manner by the trapping of a bulge 45 bordering the periphery of the central orifice 43 between the skirt 13 and the periphery of the piston 17. The diaphragm 13 is also fixed sealingly inside the envelope 13 by the trapping of an annular bulge 47 bordering the front longitudinal end of the tube between the shells 3, 5.

The work chamber 9 is a variable-pressure chamber; at rest it is in communication with the vacuum chamber 11 and is therefore subjected to the low pressure; during a braking action, the communication between the vacuum chamber 11 and the work chamber 9 is interrupted and the communication between the work chamber 9 and the external environment is opened to allow a fluid pneumatically at high pressure to enter the work chamber 9, this high-pressure pneumatic fluid may, for example, be air at atmospheric pressure. The difference in pressure between the vacuum chamber 11 and the work chamber 9 causes the skirt 13 and the piston 17 to move toward the push rod and therefore boosts the braking action of the driver on the brake pedal.

During braking and during the movement of the skirt along the axis X and of the piston under the difference in pressure between the work chamber and the vacuum chamber, the diaphragm, commonly known as a rolling seal, rolls along the radially internal wall of the envelope 1.

Figure 2:
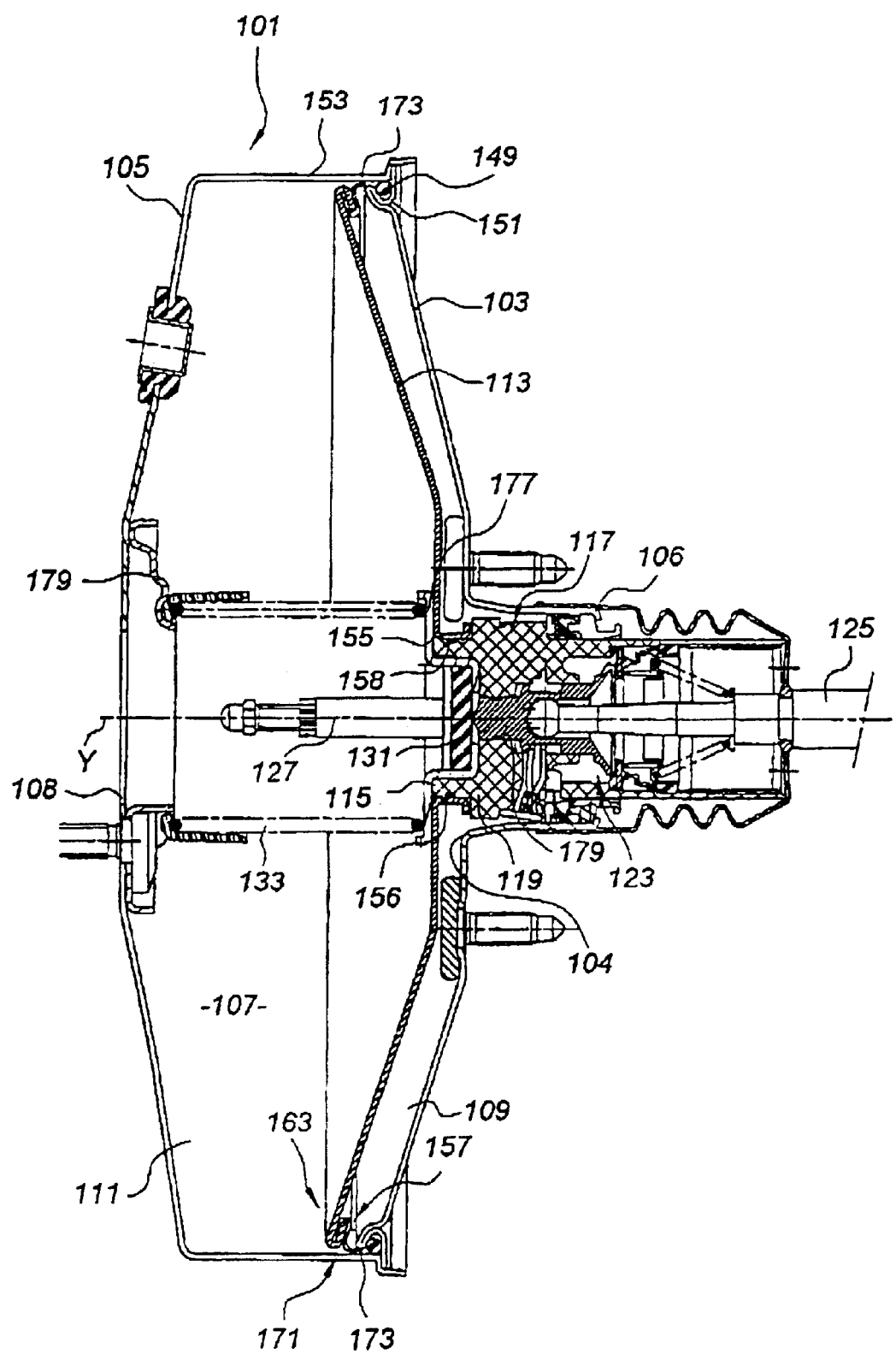
FIG. 2 is a view in section of a pneumatic brake booster according to the present invention.

FIG. 2 shows a pneumatic brake booster according to the present invention.

Figure 3:
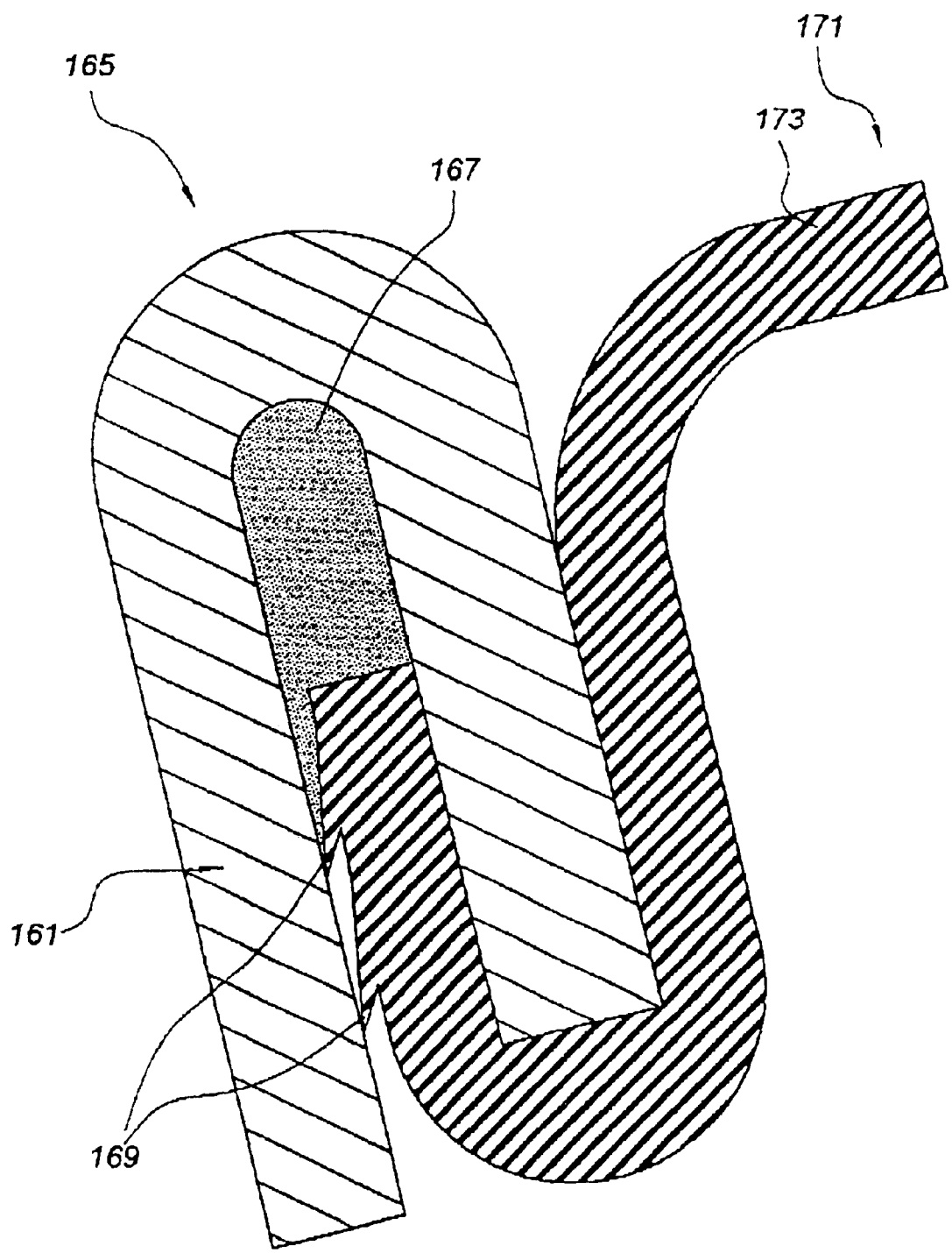
FIG. 3 is a detailed view of FIG. 2.

In FIGS. 2 and 3, the elements described hereinbelow are roughly symmetrical of revolution about the axis X, the longitudinal axis of the brake boosters described.

The pneumatic brake booster according to the present invention, of axis Y, comprises an envelope 101, a skirt 113 mounted to slide with sealing in the envelope 101, a pneumatic piston 117 mounted fixedly in a central part of the skirt 113, said piston 117 being equipped with a three-way valve able to place a low-pressure chamber 111, arranged in front of the skirt 113, in communication with a variable-pressure chamber 109 behind the skirt 113. Sealing between the chambers 111 and 109 is performed by a first and a second sealing means 157, 156 which are arranged respectively between the skirt and the envelope and between the skirt and the piston.

The lid is formed of a lid 103 and of a dish 105 equipped with a rim 153, for example made of thin pressed steel sheet, the lid 103 fitting into the dish 105 and comprising a sealing means 159, for example a seal, mounted fixedly in an annular groove 151 formed on the radially external periphery of the lid formed by bending the sheet metal, the seal 149 being pressed sealingly against the internal surface of the rim 153 of the dish 105. The lid 103 comprises a central orifice 104 extending rearward in the form of a hollow shaft 106 in which a rear part of the pneumatic piston 117 is slideably sealingly mounted, and the dish 105 comprises a central orifice 108 receiving a master cylinder (not depicted). The envelope 101 defines an interior volume 107 in which there is slideably mounted with sealing along the axis Y, a skirt 113 of roughly annular shape comprising, in its central part, an orifice 115 in which there is fixedly and sealingly mounted a forward-directed first end 119 of the pneumatic piston 117 which end is formed of a first sleeve force-fitted into the skirt 13. The orifice 115 is bordered by a channel 155 the exterior surface of which surrounds the sleeve 119 of the piston 117. The second first sealing means 156, for example an O-ring seal, is arranged in sealed contact against the exterior surface of the channel 155 in a groove 158 made on the exterior periphery of the sleeve 119 of the piston 117.

The vacuum chamber 111 being in communication with a vacuum source, for example a vacuum pump or the engine manifold depression.

The sealing between the skirt 113 and the envelope 101 is performed by the first sealing means 157 fixed with respect to the skirt 113 and mounted so that it can move and able to slide along the interior surface of the rim 153 of the envelope 101.

The first sealing means 157 is formed of a portion of tube of small length relative to its diameter, the diameter of the tube 157 being roughly equal to the outside diameter of the skirt 113. A first longitudinal end 161 of the tube 157, directed forward, is mounted fixedly at a radially external end 163 of the skirt 113 by the trapping of this first end 161 of the tube 157 by means of an annular fold 165 directed toward the actuating rod 125 and formed on the radially external end of the skirt 113. Advantageously, a low-pressure cavity 167 is provided between the fold 165 and the first longitudinal end 161 of the part of the tube 157, and sealing tabs 169 on the exterior surface of the tube 157 trapped in the fold 165, said tabs 169 being directed in the opposite direction to the low-pressure cavity 167.

During the braking phase, the tabs 169 are pressed hard against the skirt 113 because of the difference in pressure between the work chamber 109 and the low-pressure chamber 111, increasing the sealing between the skirt 113 and the tube 157.

At rest, the tabs 169 lift off the skirt 113 because the pressures in the vacuum chamber 111 and in the work chamber 109 become balanced, allowing the cavity 167 to be resupplied with low-pressure pneumatic fluid and thus making it possible to increase the sealing between the vacuum chamber 111 and the work chamber 109 in the braking phase.

It is possible to anticipate the first end 161 of the tube 157 being fixed sealingly to the skirt 113 in some way other than by trapping, for example by attachment to the skirt; it will then be necessary to provide attachment means on the skirt and on the tube 157 able to collaborate with each other, or by bonding, but there is then no longer any need to provide the chamber at atmospheric pressure 172.

At a second longitudinal end 171 of the tube 157, directed toward the rear, the external surface of the tube forms an annular lip 173 in roughly tangential contact with the internal surface of the rim 153 of the dish 105. The application of the lip 173 to the internal surface of the rim 153 of the dish 105 is increased during a braking phase by the difference in pressures between the vacuum chamber 111 and the work chamber 109, the lip 173 actually being "sucked" toward the vacuum chamber 111 and becoming "stuck" to the internal surface 153 of the dish 105. The lip 173 is long enough to provide the sealing of the two chambers 109, 111 without the risk of becoming situated between the radially external end of the skirt 113 and the rim 153.

The sealing depends on the force with which the annular seal 156 is applied to the interior surface of the rim 153, which is, for example, a force of compression of the annular seal between the skirt and the rim 153.

The sealing means 157 is made of an elastic material that is supple and airtight, for example of rubber or of slippery EPDM.

The pneumatic piston 117 is formed of a piece with approximate symmetry of revolution, pierced with a longitudinal through-passage 179 receiving a three-way valve 123 of known type actuated by an actuating rod 123 connected to a brake pedal (not depicted), the valve 123 at rest placing the vacuum chamber 111 and the work chamber 109 in communication and during a braking phase placing the work chamber 109 in communication with the high-pressure external environment.

We shall not describe the structure and operation of the three-way valve, which are known.

The braking action supplied by the driver and the boosting supplied by the booster is transmitted to at least one piston of a master cylinder via a push rod 127. A reaction disk 131 is arranged between a distributor plunger 133 forming part of the three-way valve 123 and receiving a longitudinal front end of the control rod 125 and a longitudinal rear end of the push rod 127 and transmitting the reaction from the braking circuit to the brake pedal.

A return spring 133 is mounted in compression in the vacuum chamber, in the example depicted, it bears between a reinforcing piece 179 applied against the internal surface of the dish 105 and the edges of a roughly hat-shaped piece 177 the end wall of which collaborates with the front face of the pneumatic piston 117 and the edges of which are partially pressed against the front face of the skirt 113.

In operation, the driver depresses the brake pedal which moves the actuating rod 125. There is therefore closure of the communication between the vacuum chamber 105 and the work chamber 103 and opening of the communication between the work chamber 103 and the external environment at atmospheric pressure. Because of the difference in pressure that arises between the work chamber 103 and the vacuum chamber 105, the skirt 113 and the pneumatic piston 117 move toward the push rod 127 along the axis Y. The outer end of the sealing means 157 able to slide sealingly, over the interior surface of the rim 153 of the envelope 101 provides sealing between the work chamber 109 and the front chamber 111 without impeding the longitudinal movement of the skirt in the envelope 101.

There has indeed been produced a booster comprising means of sealing between the vacuum chamber and the work chamber that are simple and inexpensive because the sealing piece providing sealing between the internal surface of the envelope and the skirt is manufactured from a tube made of elastic and airtight material for example, of rubber or slippery EPDM, cut longitudinally to the desired length, and sealing between the skirt 113 and the pneumatic piston 117 is performed by means of a standard O-ring seal of low cost price. It is therefore no longer necessary to produce a molded diaphragm in the form of a pot with bulges bordering its ends.

In addition, mounting is simplified because the sealing means is fixed only to the skirt and simply rests against the internal surface of the envelope.

Of course a pneumatic brake booster comprising a work chamber arranged at the front of the booster and a vacuum chamber arranged at the rear of the booster does not constitute a departure from the scope of the present invention.

The present invention applies particularly to the motor industry.

The present invention applies mainly to the motor vehicle braking industry, particularly concerned with private cars.

We claim:

1. Pneumatic brake booster comprising an envelope (101) of longitudinal axis (Y) formed of a dish (105) equipped with a rim (153) and a lid (103), said envelope (101) defining an interior volume (107) divided sealingly into a variable-pressure work chamber (109) and a low-pressure chamber (111) by a skirt (113) mounted to slide with sealing alone the longitudinal axis (Y) in the envelope (107), said skirt (113) being equipped with a central orifice (115) in which a pneumatic piston (117) is sealingly mounted, a three-way valve (123) mounted in the pneumatic piston (117) and actuated by an actuating rod (125) connected to a brake pedal, the said sealing between the variable-pressure work chamber (109) and the low-pressure chamber (111) is achieved by a first sealing means (156) arranged between a radially internal first end of the skirt (113) and a radially external end of the piston (117) and by a second sealing means (157) arranged at a radially external second end of the skirt and the internal surface of the rim (153), the skirt providing sealing between the radially external first end of the skirt and the radially internal second end of the skirt, the second sealing means being a sealing piece (157) of tubular shape fixed to the skirt (113) and bearing against the interior face of the rim (153) of the dish (105) and able to slide over said interior face, the said sealing piece (157) at a first longitudinal end (161) is fixed by trapping in a fold (165) made on an external radial end (163) of the skirt (113), characterized in that a low-pressure cavity (167) is produced in the fold (165), between the interior end of the fold (165) and the first end of the sealing piece (157).

2. The pneumatic brake booster according to claim 1, characterized in that the first end (161) of the sealing piece (157) has tabs (169) oriented toward the actuating rod (125) bearing, during braking, upon the skirt (113).

3. The pneumatic brake booster according to claim 1, characterized in that the first sealing means is an O-ring sal (156) mounted in a groove (158) made on the external periphery of the pneumatic piston (117).

4. The pneumatic brake booster according to claim 3, characterized in that the sliding piece (157) is made of slippery EPDM.

5. The pneumatic brake booster according to claim 1, characterized in that a second longitudinal end (171) of the sealing piece (157), forming a rearwardly-directed lip (173), is able to slide over the internal face of the rim (153) of the dish (105).

6. The pneumatic brake booster according to claim 1, characterized in that the sealing piece (157) is made of rubber.

7. The pneumatic brake booster according to claim 1, characterized in that the lid (103) is fitted sealingly into the dish (105).

8. The pneumatic brake booster according to claim 7, characterized in that the sealing element (149) is an O-ring seal mounted in a groove (151) formed in the external radial end of the lid (103) and bearing against the internal face of the rim (153 of dish (105).

9. The pneumatic brake booster according to claim 8, characterized in that the groove (151) is produced by folding.

* * * * *